United States Patent Office 3,515,799
Patented June 2, 1970

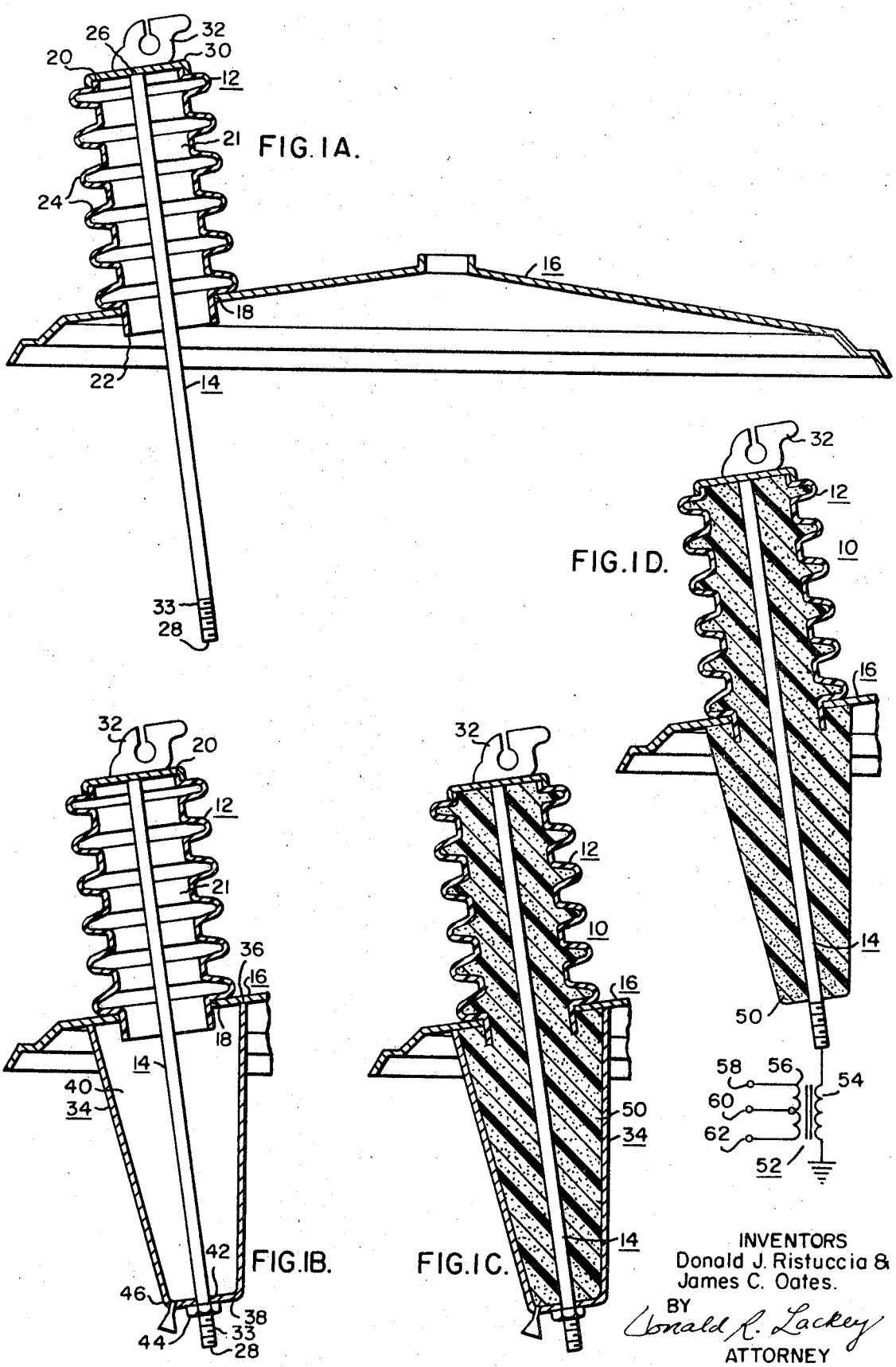

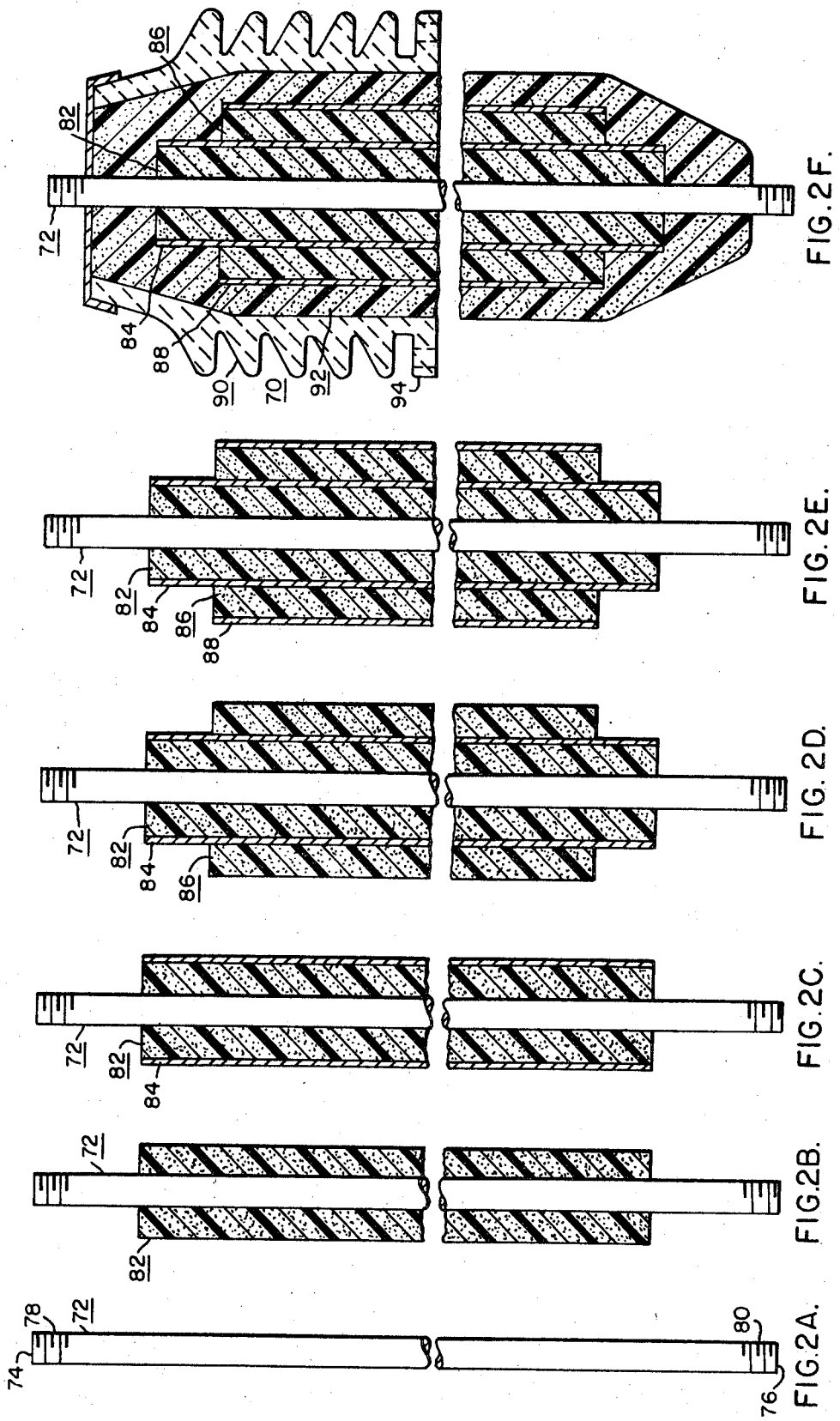

3,515,799
ELECTRICAL BUSHING MOUNTED IN CASING WITH FOAMED RESIN
Donald J. Ristuccia and James C. Oates, Sharpsville, Pa., assignors to Westinghouse Electric Corporation, Pittsburgh, Pa., a corporation of Pennsylvania
Filed Feb. 11, 1969, Ser. No. 798,307
Int. Cl. H01b 17/26, 17/28, 19/00
U.S. Cl. 174—153
5 Claims

ABSTRACT OF THE DISCLOSURE

Electrical bushing structures, and methods of constructing same, having insulating body portions formed of rigid foamed resin. In one embodiment of the invention, the bushing assembly is permanently mounted through an aperture in the enclosure of its associated apparatus, by foaming the resin system about a conductor stud disposed coaxially through a hollow weatherproof housing, which is disposed on the weather side of the enclosure, and a mold disposed on the encased side of the enclosure. If capacitor plates are required, they are formed by disposing a conductive stud in a mold and forming a first radial section of the insulating body member with foamed resin, removing the conductive stud and first radial section from the mold and coating a predetermined portion of the first radial section with the material of which the capacitor plates are to be formed. The steps of forming radial body portions or sections and coating them are then repeated, until the desired number of capacitor plates are obtained. The built-up composite capacitor body section may then be permanently foamed into place through an aperture of an enclosure, or it may be used in any other suitable bushing structural arrangement.

BACKGROUND OF THE INVENTION

(1) Field of the invention

The invention relates in general to electrical bushing structures and their associated electrical apparatus, such as transformers, and more particularly to electrical bushing structures of the type which have their insulating body portions formed of a foamed solid resin system.

(2) Description of the prior art

Bushing assemblies of the prior art require mounting means for securing the bushing in assembled relation with the casing of its associated electrical apparatus, as well as a sealing member for hermetically sealing the entry of the bushing into the casing. If the insulating body portion of the bushing is constructed of porcelain, an additional sealing means is required between the conductor stud and porcelain body portion of the bushing. The mounting hardware and sealing members represent a substantial portion of the overall cost of the bushing assembly, and it would therefore be desirable to provide a new and improved bushing assembly which reduces the cost of mounting and sealing the bushing assembly.

When the voltage applied to an electrical bushing exceeds a predetermined magnitude, it is common to dispose one or more concentrically spaced capacitor plates in the insulating body portion of the bushing, about the conductor stud of the bushing assembly, to enforce a more favorable distribution of electrical stress across the solid insulation of the bushing which separates the conductor stud from the metallic casing of the associated apparatus. When porcelain type bushings are used, the capacitor section is built-up of a plurality of turns of cellulosic insulation which has metallic foils interspersed therein to provide the desired number of capacitor plates, and this laminated structure is then disposed in the porcelain shell and impregnated with oil. When cast resinous insulating bushings are used instead of bushings of the porcelain type, substantial savings are experienced by disposing the capacitor plates in the mold and introducing the casting resin therein, embedding the capacitor plates within the cured solid resin system. It is difficult, however, to properly hold and orient the capacitor plates within the mold, as the fairly viscous casting resin may displace the capacitor plates as it is introduced, or when it is cured. Therefore, it would be desirable to provide a new and improved method of providing capacitor plates in cast type insulating bushing structures, which enables the plates of the desired longitudinal dimension to be disposed at the desired radial locations, without encountering the problems associated with supporting thin capacitor plates and maintaining their desired relative positions as the casting resin is introduced, gelled and cured.

SUMMARY OF THE INVENTION

Briefly, the present invention is a new and improved electrical insulating bushing, and methods of constructing same, which is mounted through an aperture of its associated electrical apparatus, such as a distribution transformer, providing a hermetic seal therewith, while completely eliminating auxiliary mounting hardware and sealing members. The insulating body member of the bushing is formed of a rigid foamed resin system, with the resin being foamed about a conductor stud while the stud is disposed through the aperture in the casing of the associated apparatus. Molds disposed on opposite sides of the casing, surround the aperture, with the foamed resin coming into contact with and tightly adhering to the portion of the casing immediately adjacent the aperture, to solidly mount the conductor stud in the aperture and hermetically seal its entry into the casing. Thus, mounting hardware, such as spring grip nuts, or spring and flange assemblies, are eliminated, as are sealing members, such as elastomeric rings or gaskets. The mold disposed on the weather side of the casing may be formed of a weatherproof insulating material and retained as a permanent part of the bushing assembly. The mold on the encased side of the apparatus may be removed or retained, as desired.

When a capacitor type bushing is required, the capacitor plates are formed by progressively foaming radial sections of the insulating body portion of the bushing, with each foaming step being followed by coating a predetermined portion of the outer surface of the radial section with conductive, partially conductive, or semiconductive material. This composite capacitor section may then be mounted and sealed through an aperture of a casing by foaming it into molds disposed on opposite sides of the aperture, as hereinbefore described, or it may be used as the capacitor section in other types of electrical bushing assemblies.

BRIEF DESCRIPTION OF THE DRAWINGS

Further advantages and uses of the invention will become more apparent when considered in view of the following detailed description and drawings, in which:

FIGS. 1A through 1D are elevational views, in section, which illustrate the steps of constructing a new and improved electrical bushing assembly according to the teachings of an embodiment of the invention; and FIGS. 2A through 2F are elevational views, in section, which illustrate the steps of providing capacitor plates in a cast insulating bushing structure, according to the teachings of another embodiment of the invention.

DESCRIPTION OF THE PREFERRED EMBODIMENTS

Referring now to the drawings, FIGS. 1A through 1D are elevational views which illustrate the steps of providing a new and improved electrical insulating bushing structure according to a first embodiment of the invention. In this embodiment, bushing mounting hardware and sealing members are completely eliminated by constructing the bushing such that the insulating body portion of the bushing assembly performs the functions of mounting and sealing the bushing relative to the casing of its associated apparatus. In general, this is accomplished by forming the insulating body portion of the bushing with a rigid, foamed, closed cell resin system, while the conductor stud is disposed through the aperture of the associated electrical apparatus, and with portions of the conductor stud on both sides of the aperture being enveloped by molds.

More specifically, FIG. 1A is an elevational view, partially in section, of the components required for performing the first step of the method of constructing the bushing assembly 10 shown in FIG. 1D. A first mold 12 and conductor stud 14 are provided, along with the portion of the casing of the associated apparatus having the aperture for receiving the bushing assembly 10, which in this instance is a cover 16 of a distribution type transformer, which has an aperture 18 disposed therein for receiving the electrical bushing.

The first mold 12 has a generally cylindrical, elongated configuration, having first and second ends 20 and 22, respectively, an opening 21 which extends between its ends, and a plurality of weather sheds 24 formed in its outer surface. Mold 12 is a permanent part of bushing assembly 10, and is accordingly formed of a weather resistant insulating material. For example, as shown in FIG. 1A, mold 12 may be a shell formed of a high density synthetic resin system, such as polyethylene, or it may be a porcelain shell similar to conventional porcelain weather housings. The second end 18 of mold 12 is tubular in configuration, and is sized to snugly fit the aperture 18, extending through the aperture from the weather side of cover 16 for a predetermined dimension, past the side of cover 16 which will be encased when assembled with the tank portion of the distribution transformer. The first mold 12 may be easily positioned in aperture 18 by placing its second end 22 through the aperture and resting the first weather shed adjacent end 22 against the cover 16.

The terminal stud 14, which has first and second ends 26 and 28, respectively, may be formed of any good electrical conductor, such as copper or aluminum, and may be of any suitable construction. For example, when using a thin shell mold or envelope 12, as illustrated in FIG. 1A, the first end 26 of conductor stud 14 may be electrically connected to a metallic cap member 30 which encloses end 20 of the first mold member 12, with the metallic cap member 30 having terminal means 32 electrically connected thereto, adapted for fastening the conductor of an external electrical circuit thereto. Conductor stud 14 may have a plurality of threads 33 disposed adjacent its second end 28, adapted to receive a nut, or it may have a flattened end with an opening therein. Thus, after the first mold member 12 is positioned in aperture 18, the conductor stud 14, along with cap member 30 and terminal means 32, is inserted coaxially through the longitudinal opening of the first mold 12 until the depending flange of the cap member encompasses the upwardly extending tubular end portion 20 of the first mold 12.

The next step of the method for constructing bushing assembly 10 is shown in FIG. 1B, and it includes providing a second mold 34. The second mold 34 is substantially cone-shaped, having first and second ends 36 and 38, respectively, and an opening 40 which extends between its ends. The first end 36 of mold 34 is open, with the opening at end 36 having a diameter substantially larger than the diameter of aperture 18.

The opening 40 tapers smoothly inwardly to the second end 38, which is partially closed, containing an aperture 42 sized to snugly receive conductor stud 14. The longitudinal dimensions of mold 34 and conductor stud 14 are selected to provide the desired dimension of bushing assembly 10 which is to extend inside the cover 16, with the end 28 of conductor stud 14 extending through aperture 42 of mold 34. As shown in FIG. 1B, mold 34 is disposed on the encased side of cover 16, and is telescoped over conductor stud 14 with its first end contacting the cover 16 and uniformly encompassing the aperture 18. End 28 of conductor stud 14 extends through aperture 42, and a nut 44 is threadably engaged with the threads 33, if threads are provided, to snugly secure the second mold 34 against cover 16 and at the same time secure mold 12 against the opposite side of cover 16, and position the second end 28 of conductor stud 14 at the proper location. If end 28 is not threaded, any other suitable means may be used to secure mold 34 in the desired position. By uniformly encompassing aperture 18 in cover 16 with the opening at end 36 of mold 34, conductor stud 14 will be automatically fixed at the longitudinal axes of the first and second molds 12 and 34, respectively, and the openings 21 and 40 in the first and second molds 12 and 34, respectively, will cooperate to provide a single continuous chamber between the first end 20 of mold 12 and the second end 38 of mold 34. Mold 34 has an opening 46 therein through which the resin system for forming the insulating body portion of bushing assembly 10 may be introduced.

If mold 34 is not a permanent part of the bushing assembly 10, it may be formed of any suitable material, metallic or insulating, and should contain a suitable mold release material on the wall which defines its opening 40. If mold 34 is retained as a permanent part of bushing assembly 10, it should be formed of an insulating material which will bond tightly to the foamed resin system used.

The next step of the process of constructing bushing assembly 10 is shown in FIG. 1C, and it includes introducing the resin system into the cooperative molds 12 and 34 through aperture 46, foaming the resin system to completely fill the chamber formed by openings 21 and 40, and curing the foamed resin system to form a rigid solid insulating body portion 50 which is continuous between ends 20 and 38 of the first and second molds 12 and 34, respectively.

While any suitable foamed resin system may be used which possesses the required mechanical and electrical strengths, such as resins of the urethane, epoxy, phenolic or silicone type, the rigid, closed-cell polyurethane foams have been found to be excellent, as they have a relatively low cost, they may be foamed in place, they provide good adhesion to the materials of which the first mold 12 may be formed, their density may be easily controlled to provide the requisite strength, for example, between two and twenty-five pounds per cubic foot, they may be blown with fluorocarbons, such as Freon, which gives them excellent electrical strengths, and they will withstand the environmental temperature and chemical conditions to which the bushing will be subjected, such as the temperature within the casing, and the fluid dielectric disposed within the casing of the associated electrical apparatus, such as transformer oil.

The foamed casting resin remains in contact with the conductor stud and molds during curing, unlike unfoamed resin systems, due to the hot gases in the cells of the foamed resin system. Further, other insulating gases may be introduced during foaming, if desired, such as $SF_6$, which will fill the closed cells and provide a high dielectric strength.

Since the specific formulation of the foamed resin system is not a part of this invention, and since suitable plastic foams, their compositions, and the methods for producing them are well known in the art, they are not described in detail herein. For example, see U.S. Pat. 3,072,582, issued Jan. 8, 1963 entitled "Polyether-Urethane Foams and Method of Making Same" or "Handbook of Foamed Plastics" by R. J. Bender, Editor, Lake Publishing Corporation, Libertyville, Ill., 1965.

If the second mold 34 is to be retained as a permanent part of bushing assembly 10, the bushing assembly 10, along with its mounting and sealing in cover 16 will be complete after the solid rigid foamed insulation 50 has been cured. If mold 34 is to be removed after the solid insulation 50 has been cured, the removal of the mold will be the last step of the method, with FIG. 1D illustrating the completed bushing assembly 10 after mold 34 has been removed. Bushing assembly 10 is then completely mounted and sealed through cover 16, and is adapted for connection to a transformer 52, which is shown schematically in FIG. 1D. Bushing assembly 10 may be the high voltage bushing of transformer 52, having its conductor stud 14 connected to high voltage winding 54 of transformer 52. The secondary winding 56 of transformer 52 is connected to bushings 58, 60 and 62, which may also be foamed into assembly with the transformer casing, such as the cover 16, or through the tank portion of the casing. Bushing assembly 10 may also be foamed into assembled relation with the tank portion of the casing, instead of the cover portion as illustrated, depending upon the specific requirements of the transformer.

An example of a successful method and apparatus for constructing bushing assembly 10, is to provide a hollow weatherproof insulating structure or first mold 12 having first and second open ends 20 and 22, disposing the second end of the insulating enclosure 12 through the aperture 18 of cover 16, with the second end of enclosure 12 extending past the encased side of cover 16 by a predetermined dimension, disposing an electrically conductive stud member 14 coaxially through the enclosure 12 with its first end 26 being accessible at the first end of enclosure 12 and its second end 28 extending past the second end of enclosure 12 by a predetermined dimension, sealing the first end 20 of enclosure 12 by cap member 30, which is electrically connected to the first end 26 of conductive stud 14, providing a second hollow enclosure or mold 34 having first and second ends 36 and 38, respectively, disposing the first end of the second mold against the encased side of cover 16, encompassing the aperture 18 therein, and with the second end 28 of conductive stud member 14 extending snugly through the opening in the second end 38 of the second mold 34, filling the hollow first and second molds 12 and 34 with a Freon blown polyurethane resin system, and curing the foamed resin system for 60 minutes at 80–125° C. to provide a rigid, solid cellular foamed resin insulation system having a density of 2–25 pounds per cubic foot. Before the resin system is foamed within the cooperating mold portions, the cover 16 should be degreased and moisture should be removed from all of the parts, to insure a good high strength bond between the foamed resin system and the cover 16, and between the foamed resin system and the weather-resistant mold 12, as well as between the resin system and conductive stud 14.

When cast bushings of the capacitor type are to be constructed, the thin metallic inserts which form the capacitor plates must be inserted into the mold and held in position while the resin system is introduced and cured. If the inserts, such as tubes or cylindrical foils, are moved during the introduction of the resin system, and its curing to a rigid solid, the electrical stress grading aspects of the capacitive structure will be less than optimum. Thus, a variety of different methods of holding and locating the capacitor plates have been proposed in the prior art. FIGS. 2A through 2F illustrate the steps of a new and improved method of constructing electrical bushing assemblies of the type which utilize stress grading capacitor plates, which greatly simplifies the construction of capacitor type bushings and completely eliminates the possibility of capacitor plates moving, tearing or cracking during the introduction of the casting resin system and the subsequent curing thereof.

More specifically, FIGS. 2A through 2F are elevational views, in section, of the components required to provide the bushings assembly 70 shown in FIG. 2F, according to the teachings of another embodiment of the invention. FIG. 2A illustrates the first step, which includes providing an electrically conductive stud 72 having first and second ends 74 and 76, respectively, which is formed of a good electrical conductor, such as copper or aluminum. Conductive stud 72 may have threads 78 and 80 disposed adjacent its first and second ends 74 and 76, respectively, for cooperating with nuts to secure external electrical leads thereto, or they may be adapted for receiving any suitable fastening means.

The next step, shown in FIG. 2B, includes disposing conductor stud 72 in a mold (not shown), and introducing a resin system therein which is foamed and cured to provide a first body portion 82 thereon having a predetermined longitudinal and radial build dimensions.

The next step, shown in FIG. 2C, is to coat a predetermined portion of the outer surface of the first body portion 82 with a coating 84 of material, which coating forms the first capacitor plate. Coating 84 may be applied in any suitable manner, such as by painting or spraying, and may be electrically conductive, such as aluminum, partially conductive, such as carbon, or semiconductive, i.e., having a voltage dependent resistivity, such as a paint containing finely divided silicon carbide.

If additional capacitor plates are required, the steps of foaming the radial body portions and coating these body portions are repeated the desired number of times, with the foaming taking place in a mold selected to provide the requisite length and radial build for each succeeding radial body portion. For example, as shown in FIG. 2D, the conductor stud 72 and the first radial body portion 82 which has been formed thereon are disposed in a mold (not shown) and a resin system is introduced therein, foamed and cured to provide a second radial body portion 86 directly over the coated first body portion 82, with the second radial body portion having a predetermined longitudinal dimension and radial build dimension.

The next step, shown in FIG. 2E, is to coat a predetermined portion of the outer surface of the second body portion 86 with a coating 88 of the same material as coating 84, to provide a second capacitor plate, coaxial with the first capacitor plate 84 and the conductor stud 72.

After the required number of capacitor plates has been achieved by repeating the steps of forming and coating radial body portions, the resulting composite body portion may be disposed within a suitable weatherproof housing, such as a housing formed of porcelain or of synthetic resin. The composite body portion may be secured within the weatherproof housing, such as a porcelain type housing 90 shown in FIG. 2F, by using the housing as a mold and introducing a foamed resin system therein to provide a rigid foamed solid insulation 92 between the composite body portion and weatherproof jacket or housing 90. The housing 90 may have a mounting flange 94 thereon, or the housing may be of the type shown in FIGS. 1A through 1D, with the composite body portion being secured within the housing and mounted on its associated apparatus, by following the steps of the method of mounting and sealing a bushing assembly to its associated apparatus without auxiliary hardware and sealing members, as hereinbefore described relative to FIGS. 1A through 1D.

The foamed resin system of which the successively applied radial body portions of bushing assembly 70 shown in FIG. 2F are formed, may be the same as hereinbefore described relative to FIGS. 1A through 1D, with polyurethane foam being excellent because of its electrical and mechanical characteristics as well as its relatively low cost.

In summary, there has been disclosed a new and improved bushing assembly, and method of constructing same, which is mounted through an aperture of the casing of its associated apparatus, and sealed, without using any mounting hardware or sealing members. The bushing is formed and mounted in the same operation, which also reduces the number of manufacturing operations required which, along with the elimination of the mounting hardware and sealing members, substantially reduces the cost of the bushing assembly. Further, the bushing assembly is formed of a relatively low cost foamed resinous insulation system, which has its weather end encased and protected by a suitable weatherproof enclosure, and its encased end is protected by the dry atmosphere of the encased apparatus, as well as the insulating fluid of the encased apparatus into which its encased end extends. The foamed resinous insulation system is bonded tightly to the casing of the associated electrical apparatus, which securely mounts the conductor stud of the bushing assembly through an aperture of the casing, and it also seals the entry of the conductor stud into the casing. If the bushing structure is of the capacitive type, the capacitor plates are formed by progressively forming radial sections of the body member, and coating each section after it is formed with a material of which the capacitor plates are to be formed. Each successive radial body portion is formed directly on the coated preceding body portion, to completely eliminate the problems assocated with disposing thin capacitor plates or foils within a mold, and maintaining their position while introducing a resin system into the mold, and curing the resin system to a solid. The composite capacitor section may then be foamed directly into the casing of its associated apparatus, as hereinbefore described, or it may be disposed within conventional weather jackets by conventional means.

Since numerous changes may be made in the above described apparatus and different embodiments of the invention may be made without departing from the spirit thereof, it is intended that all matter contained in the foregoing description or shown in the accompanying drawings, shall be interpreted as illustrative and not in a limiting sense.

We claim as our invention:
1. A method of constructing an electrical bushing assembly, comprising the steps of:
   providing a first body portion of a foamed resinous insulating material about an electrically conductive member having first and second ends,
   coating a predetermined portion of the outer surface of said first body portion with an electrically conductive material, to provide a capacitor plate,
   repeating the steps of providing and coating insulating body portions until a composite body member having the desired number of concentrically spaced capacitor plates has been formed, with each subsequent body portion being formed on the previously coated body portion, and with the coating step covering a predetermined portion of the outer surface of each body portion after it has been formed,
   providing a weather-proof enclosure,
   providing a casing having an aperture therein,
   disposing at least a portion of the weather-proof housing through the aperture of the casing,
   disposing the composite body member within the weather-proof enclosure and through the aperture in the casing,
   and foaming a resinous insulating material between the weather-proof enclosure and composite body member, and about the aperture, simultaneously securing the composite body member within the weather-proof enclosure, and mounting the bushing assembly in the aperture of the casing.

2. Electrical inductive apparatus, comprising:
   an enclosure having an aperture therein,
   and a bushing assembly permanently mounted through the aperture in said enclosure,
   said bushing assembly including an insulating body portion formed of a foamed resin, a conductor stud, and a weatherproof insulating housing, said insulating body portion having weather and encased ends, with at least its weather end being disposed within said weatherproof insulating housing, said insulating body portion being a continuous solid srtucture, with portions both within and without the enclosure which are larger in diameter than the aperture, said insulating body portion being bonded to said conductor stud and to said enclosure about the aperture therein.

3. The electrical inductive apparatus of claim 2 wherein a portion of the weatherproof housing extends into the enclosure through the aperture.

4. The electrical inductive apparatus of claim 2 wherein the foamed resin is a polyurethane resin.

5. The electrical inductive apparatus of claim 2 wherein the foamed resin of the body portion is bonded to the weatherproof housing.

References Cited

UNITED STATES PATENTS

| 2,892,013 | 6/1959 | Gomberg. |
| 3,001,005 | 9/1961 | Sonnenberg _____ 174—142 |

FOREIGN PATENTS

| 772,054 | 4/1957 | Great Britain. |
| 929,579 | 6/1963 | Great Britain. |

LARAMIE E. ASKIN, Primary Examiner

U.S. Cl. X.R.

29—631; 174—143; 264—45, 262, 263